United States Patent
Jaakkola et al.

(10) Patent No.: US 7,366,511 B2
(45) Date of Patent: Apr. 29, 2008

(54) APPARATUS, AND ASSOCIATED METHOD, FOR FACILITATING NETWORK SCANNING BY A WLAN TERMINAL OPERABLE IN A MULTIPLE-NETWORK WLAN SYSTEM

(75) Inventors: Mikko Jaakkola, Lempaala (FI); Henry Havenrinen, Jyvaskyla (FI)

(73) Assignee: Nokia Corporation, Espoo (FI)

( * ) Notice: Subject to any disclaimer, the term of this patent is extended or adjusted under 35 U.S.C. 154(b) by 200 days.

(21) Appl. No.: 11/017,426

(22) Filed: Dec. 20, 2004

(65) Prior Publication Data

US 2006/0135068 A1 Jun. 22, 2006

(51) Int. Cl.
*H04Q 7/20* (2006.01)

(52) U.S. Cl. .............. 455/435.2; 455/435.1; 455/434; 455/426.1; 455/435.3; 455/550.1; 455/422.1; 455/500; 370/328; 370/329; 370/338; 370/343

(58) Field of Classification Search .......... 455/434, 455/446, 456.1, 450, 451, 452.2, 453, 466, 455/9, 507, 509, 512, 513, 514, 412.1, 412.2, 455/515, 67.11, 73, 560; 370/328, 329, 338, 370/343, 349
See application file for complete search history.

(56) References Cited

U.S. PATENT DOCUMENTS

| | | | |
|---|---|---|---|
| 5,442,806 A * | 8/1995 | Barber et al. ............ | 455/435.2 |
| 2003/0158922 A1 | 8/2003 | Park | |
| 2004/0066757 A1* | 4/2004 | Molteni et al. ............ | 370/329 |
| 2004/0110530 A1* | 6/2004 | Alone et al. ............ | 455/552.1 |
| 2004/0236851 A1 | 11/2004 | Kuan et al. | |
| 2005/0063334 A1* | 3/2005 | Fnu et al. ................... | 370/329 |
| 2005/0176420 A1* | 8/2005 | Graves et al. ............. | 455/424 |

* cited by examiner

*Primary Examiner*—Keith Ferguson
(74) *Attorney, Agent, or Firm*—Foley and Lardner LLP

(57) ABSTRACT

Apparatus, and an associated method, for facilitating identification of primary, secondary, and hidden SSID values in a multi-network WLAN system. A determiner embodied at a mobile terminal determines primary SSID values of networks whose beacon signals are delivered to the mobile terminal. And, responsive to the determinations, further determinations are made as to where to send subsequent probe requests to probe for secondary or hidden SSID values associated with the access points from which the beacon signals are broadcast. Thereafter, selection is made of the network with which the mobile terminal shall communicate.

21 Claims, 3 Drawing Sheets

APPARATUS, AND ASSOCIATED METHOD, FOR FACILITATING NETWORK SCANNING BY A WLAN TERMINAL OPERABLE IN A MULTIPLE-NETWORK WLAN SYSTEM

The present invention relates generally to a manner by which to identify available WLAN (Wireless Local Area Network), or other, networks available to a WLAN terminal available through which to communicate. More particularly, the present invention relates to apparatus, and an associated method, by which efficiently to scan for, and to identify, available networks in a communication system that utilizes a hidden or multiple network-identifier scheme.

A broadcast scan to all available channels is first made by a mobile, or other WLAN, terminal to identify which networks are available based upon beacon signals that broadcast primary network identifiers upon the broadcast channels. And, from this information, network stations that are to be polled using directed active scans to obtain hidden or secondary network identifiers with which the network stations, if any, are associated are selected. Selection is made in a manner to minimize the amount of polling, thereby to reduce the amount of time required to determine all available networks with which the terminal is capable of communicating.

BACKGROUND OF THE INVENTION

Advancements in communication, and other, technologies have permitted the introduction, and popular usage, of new types of communication systems. The advancements, e.g., permit increases in the rates at which data is communicated and provide manners by which to communicate data over non ideal communication channels.

New types of radio communication systems are, e.g., exemplary of communication systems that have incorporated advancements in communication technologies. Communication channels of a radio communication system are formed upon radio links rather than upon wireline connections. Because radio links are utilized upon which to form the communication channels, the need for conventional wireline connections to be established between sending and receiving stations of a communication system are obviated. Free of the need to form wireline connections between the sending and receiving stations, a radio communication system is permitting of communications between locations at which formation of wireline connections would not be possible. And, a radio communication system is amenable for implementation as a mobile communication system in which one, or more, of the communication stations is provided with mobility to form a mobile communication system.

Many communication systems utilize digital communication techniques that permit more efficient communication of data than that generally permitted through the use of analog communication techniques. Because of the particular need in a radio communication system to efficiently utilize the spectrum allocated for the formation of radio communication channels upon which to communicate data, the use of digital communication techniques is particularly advantageously implemented therein.

When digital communication techniques are utilized, information that is to be communicated is digitized. In one common technique, the digitized information is formatted in to packets according to a selected packet formatting scheme, and the packets are communicated to effectuate the communication. Individual ones, or groups, of the packets are communicated, for instance, at discrete intervals. And, once communicated, the data packets are concatenated together to recreate an informational content of the data contained therein.

Because data packets need not be communicated continuously but rather can be communicated at discrete intervals, a dedicated communication channel need not be allocated for a single communication session between a single set of communication stations. Instead, a single channel can be shared amongst a plurality of different sending and receiving station-pairs. Because a single channel can be utilized to effectuate communications by the plurality of pairs of communication stations, improved communication capacity is possible.

Communications utilizing packet-formatted data are effectuated, for instance, in conventional LANs (Local Area Networks). Wireless networks, operable in manners analogous to wired LAN's have also been developed. And, these wireless networks, referred to as WLANs (Wireless Local Area Networks), are utilized to communicate packets of data over a radio-link, thereby to effectuate communications between a sending and a receiving station.

An IEEE (Institute of Electrical and Electronic Engineers) 802.11 series of Standards sets forth operating protocols for various packet-based communication schemes. 802.11-based wireless local area networks have been implemented, and mobile terminals operable to communicate with network-based WLAN devices are increasingly utilized to effectuate communication services.

The wireless local area networks are typically operated by operators and include network structure that encompasses selected geographical areas. That is, network infrastructures of wireless local area networks provide communication services within coverage areas defined by the operational capabilities of the network structures. More than one wireless local area network might be installed to encompass a common geographical area. And, for instance in areas of heavy usage, more than two wireless local area networks might be installed to encompass a common geographical area, and in which each of the wireless local area networks is available by way of which to communicate. Depending upon operator agreements, or other criteria, a mobile terminal positioned at a location within the coverage area of the wireless local area networks has a choice of with which of the networks to communicate. Selection of with which of the networks to communicate is dependent upon any of various and sometimes selectable criteria.

Network stations, referred to as access points, of an 802.11-compatible wireless local area network generate beacons signals that include values of the network with which the access point broadcasting the beacon signal is associated. The identifier is referred to as a service set identifier (SSID). Access points, however, are sometimes configured to support multiple service set identifiers. However, only a single SSID, referred to as a primary SSID, is conventionally identified in the beacon signal. That is to say, WLAN networks typically broadcast only a single network SSID but many operators permit setting of the broadcasting to off or to configure a single access point to support multiple SSIDs. And, the access point appears as multiple wireless local area network access points. The SSIDs other than the primary SSID value are referred to as secondary SSIDs. Secondary SSIDs are revealed to a mobile terminal generally only responsive to a probe request sent by the mobile terminal that requests the identification of the secondary SSID or SSIDs.

Existing procedures by which to obtain the secondary SSIDs, however, is sometimes problematical. For instance, when a user of the mobile terminal wants to be aware of all of the WLAN networks that are available with which to communicate when the mobile terminal is positioned at a specific location and the WLAN mobile terminal has multiple WLAN access profiles, an overly time-consumptive process is required of the mobile terminal to make such identification. Conventionally, explicit probe request to all access-profile specified networks on all channels is required to obtain the information. For instance, if the number of channels upon which beacons are broadcast is 12, and a scan time per channel is 75 ms and the mobile terminal includes 10 access profiles, the product of 12×75×10=9 seconds is the time period required by which to obtain all of the information of the available WLAN networks.

A mechanism by which better to identify the available WLANs in a less time-consumptive manner is therefore required.

It is in light of this background information related to communications in a multiple-network radio communication system the significant improvements of the present invention have evolved.

SUMMARY OF THE INVENTION

The present invention, accordingly, advantageously provides apparatus, and an associated method, by which to identify available WLAN, or other, networks, available to a WLAN terminal through which to communicate.

Through operation of an embodiment of the present invention, a manner is provided by which efficiently to scan for, and to identify, available networks in a communication system that utilizes a hidden or multiple network-identifier scheme.

In one aspect of the present invention, a scan of broadcast channels is first made by a WLAN terminal to identify which networks are available based upon beacon signals that broadcast primary network identifiers upon the broadcast channels. And, from this information, networks that are to be polled to obtain hidden or secondary networks are selected. Selection is made in a manner that minimizes the amount of polling, thereby to reduce the amount of time required to determine all of the available networks, identified both by primary identifiers and by secondary identifiers.

In another aspect of the present invention, a network scan list is maintained at a mobile, or other WLAN, terminal. The network scan list is accessed to obtain the channels that the mobile terminal is to monitor to detect beacon signals broadcast by access points of WLANs when the mobile terminal is within range of such broadcasts. Once the network scan list is accessed, the entries on the access list that identify channels within the frequency band or bands are used during a broadcast scan in which the terminal monitors, e.g., successively each of the channels forming entries on the network scan list.

By successively, or otherwise, monitoring each of the channels listed on the network scan list, the mobile, or other WLAN, terminal detects broadcast of beacon signals on the monitored channels. The beacon signals include, as portions thereof, values of primary SSIDs, of the networks with which the access points that broadcast the beacon signals are associated. Through monitoring of the channels, therefore, the terminal determines, responsive to the broadcast scan what networks, identified by their primary SSIDs in whose coverage area that the mobile terminal is positioned.

In a further aspect of the present invention, subsequent to detection of the beacon signals and determination of the SSID values broadcast thereon, a further determination is made as to whether any of the detected beacons are redundant, i.e., contain the same SSID value. For instance, separate access points of the same network broadcast beacon signals that contain the same primary SSID values. Determination is made whether any of the beacon signals contain the same SSID values.

In another further aspect of the present invention, a network set is formed. The network set identifies networks whose beacon signals are detected by the mobile terminal during the broadcast scan. Redundant SSID values, if any, are removed, so that the network list includes the SSID value as only a single entry, irrespective of the number of beacon signals that contain the same primary SSID value.

The network list, once formed, is accessed by the WLAN to generate probe requests for communication to the networks identified in the network list to probe the identified networks for secondary SSID values, if any, that are associated with the network stations from which the beacons are broadcast.

The probes are, for instance, communicated sequentially to each of the network stations identified in the network list and, e.g., query the network station with respect to each access profile contained at the WLAN terminal. As the number of probe requests sent by the mobile terminal is limited responsive to the entries listed in the network list, the number of probe requests that are generated, and the associated time period required to generate, send, and await response to, the probe request is reduced relative to conventional manners by which the secondary SSID values are obtained.

In a further aspect of the present invention, the WLAN terminal monitors for responses to the probe requests. And, secondary SSID values returned to the WLAN terminal responsive to the probe requests are detected by the WLAN terminal. The secondary SSID values and the primary SSID values each identify networks that are available through which the mobile terminal is capable of communicating. A selector embodied at the WLAN terminal selects which of the available networks with which mobile terminal shall attempt to communicate. In one implementation, the selection is made by a user of the WLAN terminal. A display is generated on a user display on a user interface that lists available networks, based upon their SSID values. And, the user selects with which of the networks to attempt to communicate by selection of one of the identified networks. Selection is made, for instance, by user actuation by a user actuator embodied at the mobile terminal.

Relative to conventional manners by which to obtain both the primary and SSID values that identify the networks available with which a mobile, or other WLAN, terminal is able to communicate, the manner provided through operation of an embodiment of the present invention permits such information to be obtained in a significantly reduced amount of time, requiring reduced amounts of radio resources, and facilitates connection and resultant communications, to a selected network in a reduced amount of time.

In these and other aspects, therefore, apparatus, and an associated method, is provided for facilitating available network identification, available through a communication terminal through which to communicate. A determiner is embodied at the communication terminal. The determiner determines upon which, if any, channels of a selected channel set that network-station beacons are broadcast. The network-station beacons contain primary identifiers that identify network stations from which the beacons, respectively, are broadcast and networks primarily associated therewith. A request generator is adapted to receive indications of determinations made by the determiner. The request generator generates requests for identification of secondary identifiers, if any, of networks, if any, secondarily associated with at least a selected one of a network set of the network stations whose beacons are determined by the determiner to be broadcast upon at least a first channel of the selected channel set.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION OF THE DRAWINGS

Figure 1:
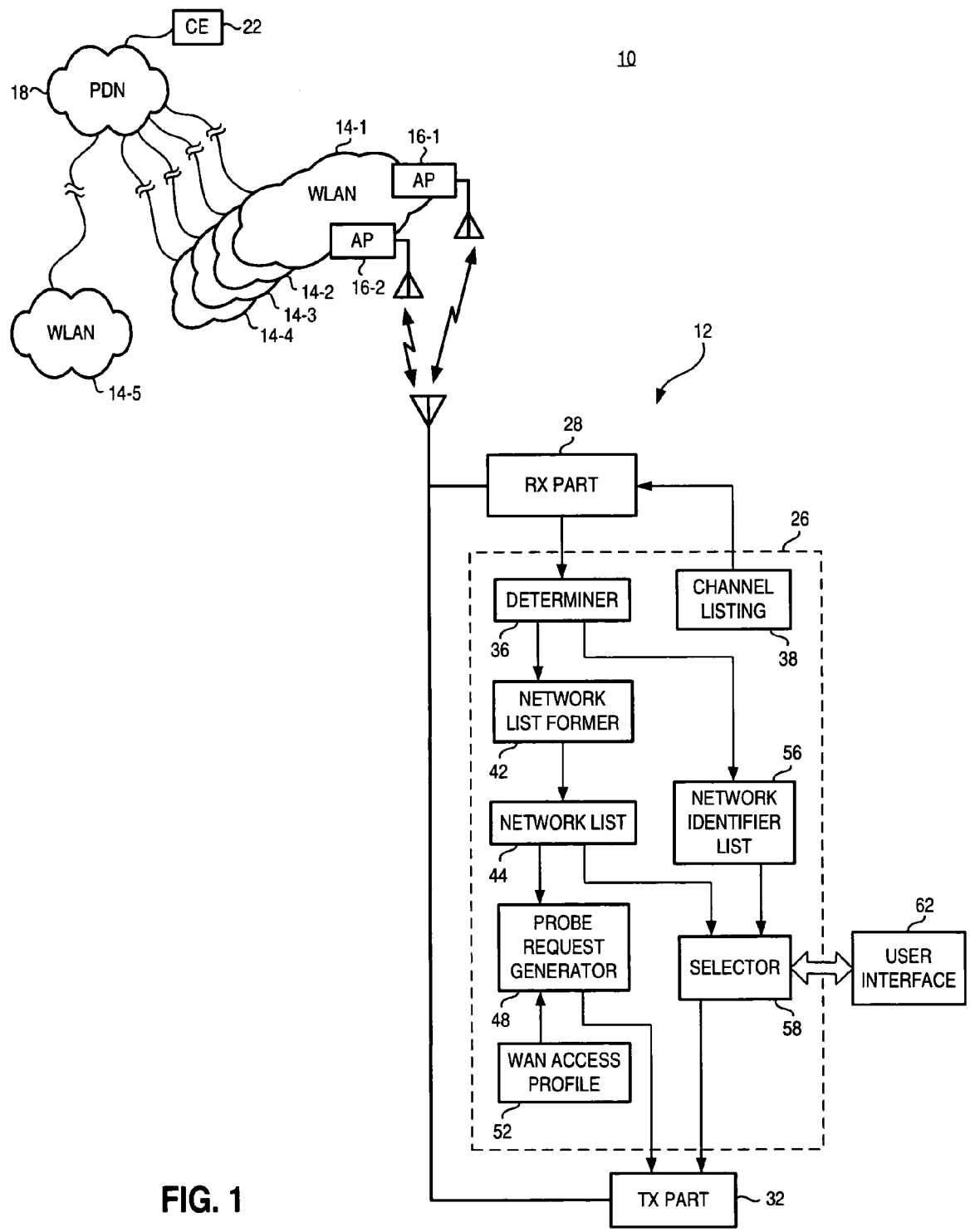
FIG. 1 illustrates a functional block diagram of a radio communication system in which an embodiment of the present invention is operable.

Referring first to FIG. 1, a radio communication system, shown generally at 10, provides for radio communications with mobile terminals, which of the mobile terminal 12 is representative. In the exemplary implementation, the mobile terminal is operable generally in conformity with the operating protocols a variant of an IEEE 802.11 communication standard. While the following description shall describe exemplary operation of the communication system in which the communications with the mobile terminal are effectuated in conformity with the variant of the 802.11 operating specification, it should be understood that the teachings of the present invention are analogously implementable in other types of communication systems, i.e., communication systems that are operable pursuant to other communication schemes and operating standards and protocols. And, while the exemplary implementation shall be described with respect to communications with a mobile terminal 12, more generally, the terminal 12 is representative of any WLAN, or communication, terminal, irrespective of its portability and mobile operability. While the term mobile terminal shall be used herein, such use is not by way of limitation.

Here, the communication system is formed of a plurality of wireless local area networks (WLANs) 14. In conventional manner, each of the wireless local area networks may include a plurality of access points (APs) 16. The access points each form radio transceivers capable of transceiving communication data with mobile terminals, such as the mobile terminal 12, when the mobile terminal is positioned within the coverage area of the access point. A pair of access points, 16-1 and 16-2 are illustrated in the figure, shown to form portions of the network 14-1. The network 14-1 also includes other access points, and others of the networks 14 also include, while not separately shown, access points capable of transceiving communication data with mobile terminals.

Here, the wireless local area networks 14-1, 14-2, 14-3, and 14-4 are configured in manners such that the respective networks encompass partially or completely, overlapping coverage areas. That is to say, the coverage areas associated with the access points of the respective networks each together define cumulative coverage areas that at least partially overlap with one another. And, the network 14-5 is representative of another wireless local area network that has a coverage area dissimilar with the coverage areas of the networks 14-1 through 14-4.

The networks 14 are here shown to be connected to a packet data network (PDN) 18 that, in turn, is coupled to a correspondent entity 22 (CE). The correspondent entity is representative of a communication endpoint that sources or sinks data communicated with a mobile terminal, such as the mobile terminal 12.

During operation of the communication system, the access points of the wireless local area networks generate beacon signals that are continuously, or otherwise, broadcast upon selected channels within the frequency bands in which the networks are operable. The beacon signals are detectable by radio receivers, such as receive parts of the mobile terminals, that are positioned within reception range of the signals. The networks 14-1 though 14-5 are each identified by an SSID (Service Set Identifier) value. However, as noted previously, access points, such as the access points 16-1 and 16-2 of the network 14-1, are sometimes configured to support multiple SSID values. Because the beacons broadcast by the access points include only the primary SSID values, a mobile terminal is unable to determine the other SSID values, the secondary SSID values, associated with the access points, merely by monitoring the beacon signals broadcast by the respective ones of the access points.

For instance, the access point 16-1 is associated with the primary SSID value associated with the network 14-1. The access point may, hover, also be associated with, and contain a secondary SSID value, that identifies the network 14-5 or some other network. Because the beacon signal broadcast by the access point 16-1 includes only the primary SSID value that identifies the network 14-1, a mobile terminal, here the mobile terminal 12, that monitors for the broadcast of the beacon signals, is not made aware of the secondary SSID value, or values, also associated with the access point. Additional polling is required of the mobile terminal to poll the access point to inquire of the secondary SSID value or values.

In conventional operation, the mobile terminal is required to send probe requests to all wireless local area network access-profile-specified networks to all channels, an unduly time-consumptive procedure. Pursuant to an embodiment of the present invention, the mobile terminal is operable in a manner, and includes apparatus, here apparatus 26, to facilitate identification of the secondary SSID values in a more time-efficient manner. The apparatus 26 is connected to the transceiver circuitry of the mobile terminal here represented by a receive part 28 and a transmit part 32.

The elements of the apparatus 26 are functionally represented, implementable in any desired manner, such as by algorithms executable by processing circuitry or by logic circuitry. When implemented using algorithms executable by a processor or controller, information stored, e.g., at a memory device is retrieved and utilized to carry out the functions performed by the apparatus. And, the apparatus need not be permanently affixed to the mobile terminal. Rather, the apparatus, in one implementation, is a detachable element, detachable from the mobile terminal, e.g., forming computer code recorded on a computer storage medium.

Through operation of the apparatus pursuant to an embodiment of the present invention, the mobile terminal is capable of identifying the primary and secondary SSID values associated with network stations of networks in whose coverage area that the mobile terminal is positioned. And, thereafter, selection is made at the mobile terminal of with which network to communicate. By earlier identifying the available networks, selection is earlier made, and communications are earlier effectuated.

The apparatus includes a determiner 36 coupled to the receive part 28 and is operable, amongst other things, to detect delivery of beacon signals at the mobile terminal. In the exemplary implementation, the apparatus includes a channel listing 38 that lists channels upon which beacon signals are broadcast. The channel list, in one implementation, is static and, in another implementation is changeable. The list identifies channels used by networks with which the mobile terminal is permitted to communicate such as pursuant to roaming or other operator agreements with whom the user of the mobile terminal maintains a subscription for, or is otherwise provided with, service. At selected times, the entries contained on the channel list 38 are accessed and used by the receive part 28 to tune to the identified channels. The receiving station tunes to the identified channels successively, such as successively in a manner in which the channels are accessed one after another during a broadcast scan.

The determiner 36 determines whether a beacon signal is delivered to the mobile terminal on a channel to which the receive part tunes. And, if a determination is made that the beacon signal is broadcast upon a monitored channel, the determiner further determines the value of the SSID forming the primary SSID broadcast as part of the beacon signal. The determiner additionally determines whether an SSID value broadcast as part of a beacon signal is redundant. That is to say, if the beacon signals are detected on different channels that include the same primary SSID value, the signals are considered to be redundant. E.g., the beacon signals broadcast by the access point 16-1 and 16-2 shall include the same primary SSID value, and the beacon signals are considered to be redundant. The determinations made by the determiner are provided to a network list former 42. The network list former operates to form a network list 44 that lists the networks whose beacon signals are detected by the determiner. The network list is redundant free. That is to say, the network list identifies networks and channels without repeated channels or networks. In one implementation, the signal power levels of the detected beacon signals are also determined. And, the power levels of the signals further are used as an additional parameter pursuant to determinations made by the determiner.

The apparatus further includes a probe request generator 48 that is selectably operable responsive to the determinations made by the determiner to access the network list 44 that lists the network stations or networks and their associated channels whose beacon signals are detected by the determiner. The probe request generator is further coupled to a WLAN access profile 52 of the mobile terminal. The access profile identifies different access profiles available to the mobile terminal. Responsive to the entries contained on the network list and the entries contained in the WLAN access profile, the probe request generator generates probe requests that are communicated to the network stations to query the network stations listed on the networks lists to inquire of secondary SSID values associated with the network stations and, thereby, the secondary networks with which the access points are associated. The probe requests are provided to the transmit part 32 and caused to be transmitted therefrom.

The determiner is further operable to monitor responses generated at the network stations responsive to the probe requests and to create a secondary network identifier list 56 that lists secondary SSID values reported by the network stations responsive to the probe requests communicated thereto. The lists 44 and 56 are accessible to a selector 58 that operates to select with which of the networks to attempt to communicate. The selection is made, for instance, manually through user actuation with a user interface 62.

Because probe requests are only sent to the network stations known to be within the reception range of the mobile terminal and because redundancies are removed, more efficient polling, in reduced amount of time, results to identify the networks with which the mobile terminal is capable of attempting to communicate.

Figure 2:
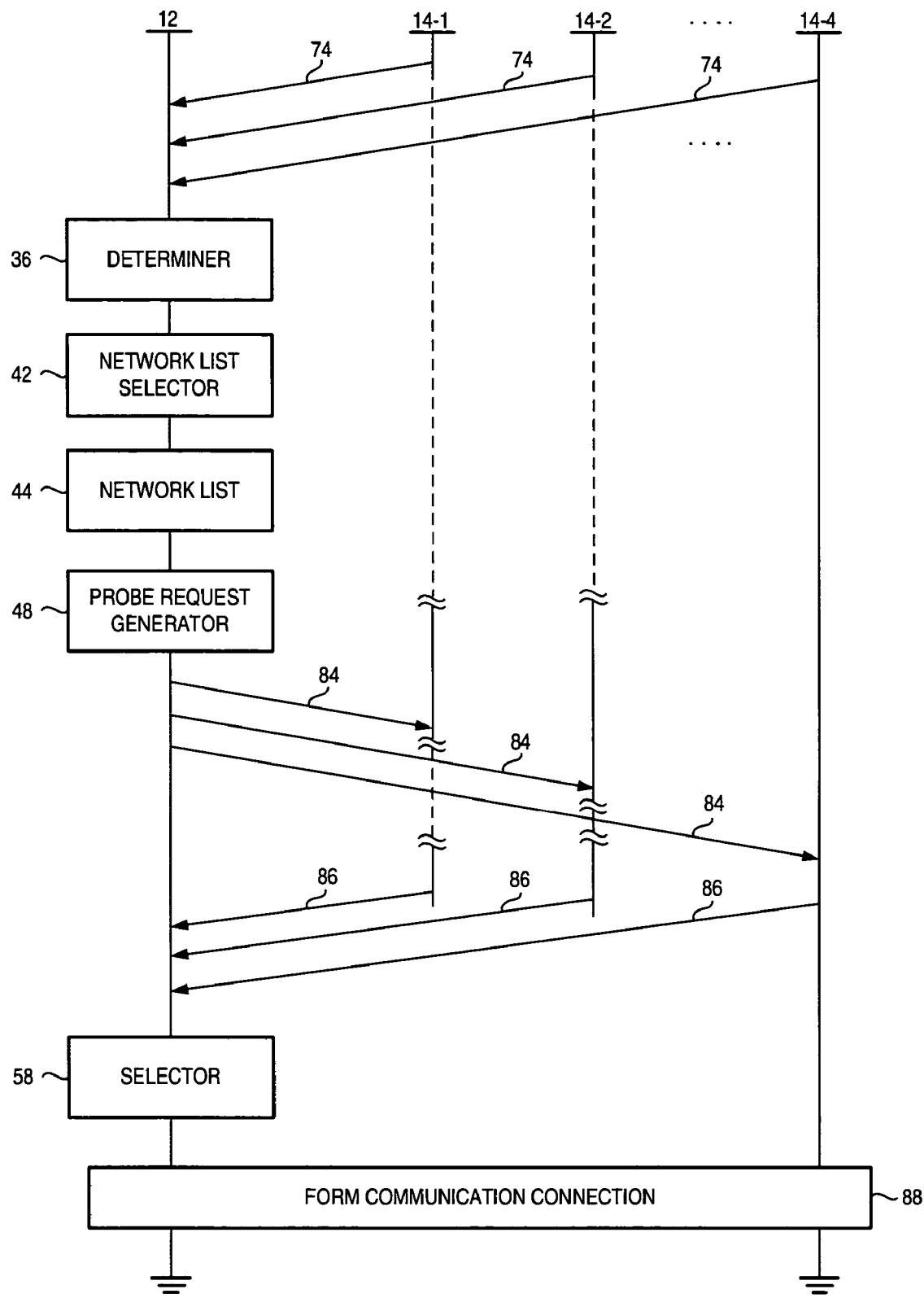
FIG. 2 illustrates a message sequence diagram representative of signaling generated during operation of the radio communication system shown in FIG. 1 pursuant to an embodiment of the present invention.

FIG. 2 illustrates a message sequence diagram, shown generally at 72, representative of signaling generated during exemplary operation of the communication system shown in FIG. 1. Here, beacon signals 74 generated by different ones of the access points of the WLANs within whose reception range that the mobile terminal is positioned are delivered to, and detected by the mobile terminal. Determinations are made by the determiner, again represented by the block 36, of the primary SSID values contained in the detected beacon signals. And, the network list selector 42 operates to form a network list 44 of the identified networks and channels upon which such networks broadcast the beacon signals containing the primary SSID values.

The network list is iterated through by a probe request generator 48. And, the probe generator, in turn, generates probe requests that are caused to be communicated by the mobile terminal 12, here represented by the segments 84, to network stations whose beacons have earlier been detected. And, as indicated by the segments 86, responsive to the probe requests are generated and returned to the mobile terminal. The values of secondary SSID values contained in the responses 86 are detected and determined by the determiner. And, selection is made by the selector 58 of with which network to attempt to communicate is made. Thereafter, and as indicated by the block 88, communications are effectuated with a selected network.

In exemplary operation, a single broadcast scan is performed by the mobile terminal to determine which channels monitored in the scan are occupied by WLAN APs. The broadcast scan is, in one implementation, an active scan and, in another implementation, is a passive scan. The scan is performed, e.g., during initial connection and start-up and is generally not required to be performed during every broadcast scan. That is to say, in exemplary operation, a single broadcast scan is performed by the mobile terminal to determine which channels monitored in the scan are occupied by WLAN APs. This channel determination scan is, in one implementation, an active scan and, in another implementation, is a passive scan. The channel determination scan is performed, e.g., during connection set-up and system start-up and is generally not required to be performed periodically during active communications. Additionally, scanning during roaming is performed against specific SSID values, and the channel determination scanning generally is not required when roaming within the same SSID. Passive scanning is needed in the event that hidden networks should be included into the communication scheme. Passive scanning, however, is sometimes relatively more time-consuming than active scanning procedures.

Responsive to the broadcast scan of the channels, the mobile terminal is made aware of the WLAN APs and their primary SSID values. Filtering is performed to filter out all of the primary SSID values that are represented on multiple channels, saving, e.g., only those values associated with beacon signals of the greatest magnitude or other signal indicia. In a hidden network scenario, there are no primary SSID values present, so filtering is not performed on these networks. Through this operation, the number of channels that remain is typically significantly reduced, thereby reducing the amount of polling significantly.

For instance, by way of example, if the number of channels is reduced from 12 to 2 and the scan time per channel remains constant, and the number of marked channels is one or two, the time required to obtain the secondary SSID values is reduced to approximately 1.5 seconds from 9 seconds.

An embodiment of the present invention is operable similarly in a 2.4 GHz implementations as well as in a 5 GHz implementation as well as dual-band WLAN implementations. As the number of channels defined at the 5 GHz band is larger than the number of channels used in a 2.4 GHz implementation, the time savings provided by the operation of an embodiment of the present invention is relatively more substantial.

In a further embodiment of the present invention, the scanning is stopped if a network-requested network is located. Not all of the WLAN APs supporting a requested network name is required to be located. Instead, one supporting WLAN AP is sufficient. In this further implementation, therefore, on average, only half of the truly occupied channels need to be scanned if the network specified by the profile is to be found during the scan.

Figure 3:
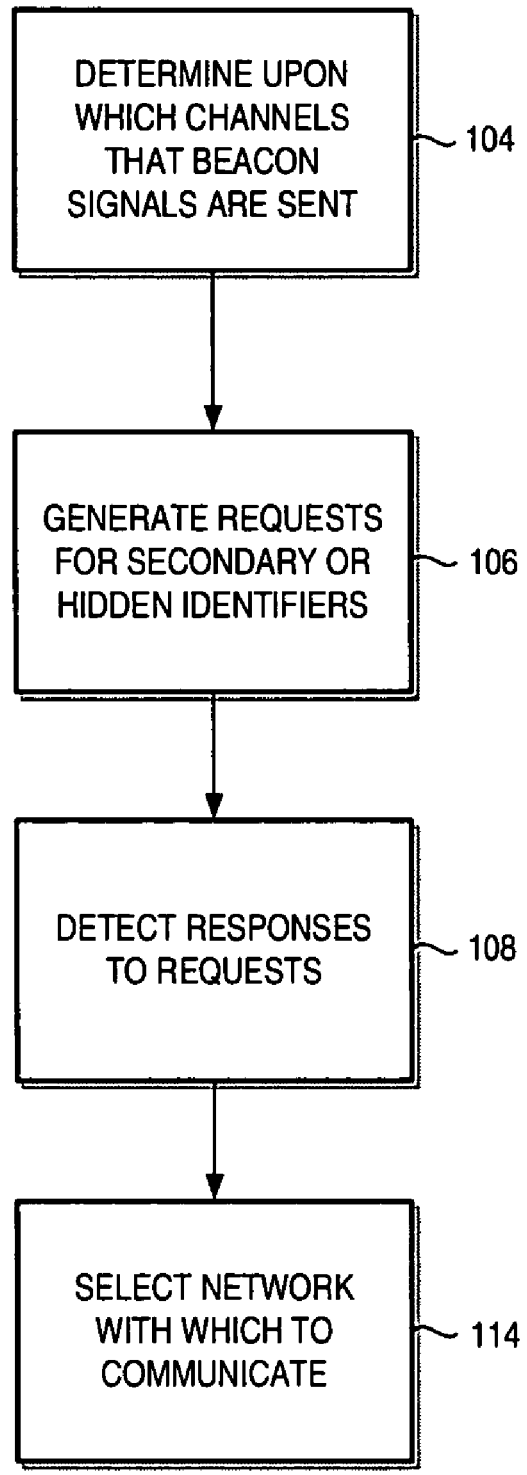
FIG. 3 illustrates a message sequence diagram of the method of operation of an embodiment of the present invention.

FIG. 3 illustrates a method, shown generally at 102, representative of the method of operation of an embodiment of the present invention. The method facilitates available-network identification, available to a mobile terminal through which to communicate.

First, and as indicated by the block 104, a determination is made upon which, if any, channels of a selected channel set that the network-station beacons are broadcast. The network-station beacons contain primary identifiers that identify network stations from which the beacons respectively, are broadcast and networks primarily associated therewith. In one exemplary implementation, if several access points of the same SSID are discovered upon different channels, ignore all but the strongest AP.

Then, and as indicated by the block 106, requests for identification of secondary identifiers of networks are generated. The secondary identifiers identify networks that are secondarily associated with at least a selected one of a network set of the network stations whose beacons are determined to have been broadcast upon at least a first channel of the selected set. In one exemplary implementation, requests are transmitted only on channels upon which beacon signals are determined to have been broadcast Thereafter, and as indicated by the block 108, responses to the requests are detected. Then, and as indicated by the block 114, selection is made of with which network that the mobile terminal shall attempt to communicate.

The operations carried out by which to identify primary, secondary, and hidden SSID values are completed more quickly and efficiently, using fewer radio resources, than conventionally required. Improved communication operations are possible as a result.

The previous descriptions are of preferred examples for implementing the invention, and the scope of the invention should not necessarily be limited by this description. The scope of the present invention is defined by the following claims.

We claim:

1. Apparatus for facilitating available network identification, available to a communication terminal through which to communicate, said apparatus comprising:
   a determiner embodied at the communication terminal, said determiner for determining upon which, if any, channels of a selected channel set that network-station beacons are broadcast, the network-station beacons containing primary identifiers that identify network-stations from which the beacons, respectively, are broadcast and networks primarily associated therewith;
   a request generator adapted to receive indications of determinations made by said determiner, said request generator for generating requests for identification of secondary identifiers, if any, of networks, if any, secondarily associated with at least a selected one of a network set of the network stations whose beacons are determined by said determiner to be broadcast upon at least a first channel of the selected channel set.

2. The apparatus of claim 1 wherein said determiner comprises a beacon detector, said beacon detector for detecting broadcast on each channel of the selected channel set of a beacon and of a primary identifier identified therein.

3. The apparatus of claim 1 wherein the communication terminal is operable in a multiple-network communication system, each network of the multiple-network communication system identified by a primary service set identifier, values of the primary service set identifier forming the primary identifiers contained in the beacons that are determined by said determiner to be broadcast upon the at least a first channel of the selected channel set.

4. The apparatus of claim 3 wherein each network of the multiple-network system comprises at least one access point and wherein the beacons that are determined by said determiner to be broadcast upon the at least the first channel of the selected channel set are broadcast by access points.

5. The apparatus of claim 4 wherein at least one network of the multiple-network set comprises a first network station formed of a first access point and a second network station formed of a second access point, beacons broadcast by each of the first and second access points, respectively, each identifying the values of the primary service set of the network of which the first and second access points form portions, and wherein said determiner further determines when beacons containing common values of the primary service set are delivered to the mobile terminal.

6. The apparatus of claim 5 wherein the network set of network stations for which said request generator generates requests comprises network stations associated with unique networks.

7. The apparatus of claim 6 wherein the requests generated by said request generator comprise separate requests for transmission to a network station of each network of the network set.

8. The apparatus of claim 1 wherein said request generator comprises a probe generator for generating probes, the probes for communication to network stations of the networks of the network set.

9. The apparatus of claim 1 wherein said determiner makes determinations responsive to a scan of the selected channel set.

10. The apparatus of claim 9 wherein a scan list is embodied at the communication terminal and wherein the selected scan list responsive to which the scan is performed and responsive to which said determiner makes determinations is derived from the scan list.

11. The apparatus of claim 1 further comprising a network selector adapted to receive indications of determinations made by said determiner and of responses to requests generated by said request generator, said network selector for selecting with which network to attempt to communicate.

12. A method for facilitating available-network identification, available to a communication terminal through which to communicate said method comprising the operations of:
   determining upon which, if any, channels of a selected channel set that network-station beacons are broadcast, the network-station beacons containing primary identifiers that identify network stations from which the beacons, respectively, are broadcast and networks primarily associated therewith;
   generating requests for identification of secondary identifiers of networks, if any, secondarily associated with at least a selected one of a network set of the network stations whose beacons are determined during said operation of determining to be broadcast upon at least a first channel of the selected channel set.

13. The method of claim 12 further comprising the operation of detecting responses to the requests generated during said operation of generating.

14. The method of claim 13 further comprising the operation of selecting with which network that the communication terminal shall attempt to communicate.

15. The method of claim 12 wherein said operations of determining and generating are performed at the communication terminal.

16. The method of claim 12 wherein said operation of determining further comprises determining whether beacons broadcast on more than one channel of the selected channel set contain primary identifiers of common values.

17. The method of claim 16 wherein said operation of determining further comprises determining which networks to include in the network set.

18. The method of claim 17 farther comprising the operation, subsequent to said operation of determining, of forming the network set, networks identified in the network set free of redundant entries.

19. The method of claim 18 wherein said operation of determining further comprises determining beacon signal indicia of network-station beacons and wherein networks identified in the network set formed during said operation of forming are of networks whose beacons are of beacon signal indicia beyond a selected threshold.

20. The method of claim 19 wherein the beacon signal indicia comprises a beacon signal power level, when received at the communication terminal.

21. A computer program product, comprising:
   a computer readable storage medium;
   computer readable code embodied in said computer readable storage medium for determining upon which, if any, channels of a selected channel set that network-station beacon are broadcast, the network-station beacon containing primary identifiers that identify network stations from which the beacons, respectively, are broadcast and networks primarily associated therewith; and
   computer readable code embodied in said computer readable storage medium for generating requests for identifiers, if any, of networks, if any, secondarily associated with at least a selected one of a network set of the network stations whose beacons are determined to be broadcast upon at least a first channel of the selected channel set.

* * * * *